United States Patent
DiBenedetto et al.

(10) Patent No.: US 8,893,469 B2
(45) Date of Patent: Nov. 25, 2014

(54) OIL BYPASS CHANNEL DEAERATOR FOR A GEARED TURBOFAN ENGINE

(75) Inventors: Enzo DiBenedetto, Torrington, CT (US); Francis Parnin, Suffield, CT (US); Denman H. James, Windsor, CT (US); Robert E. Peters, Portland, CT (US)

(73) Assignee: United Technologies Corporation, Hartford, CT (US)

( * ) Notice: Subject to any disclaimer, the term of this patent is extended or adjusted under 35 U.S.C. 154(b) by 750 days.

(21) Appl. No.: 13/165,967

(22) Filed: Jun. 22, 2011

(65) Prior Publication Data
US 2012/0324899 A1    Dec. 27, 2012

(51) Int. Cl.
| B63H 11/00 | (2006.01) |
| F02C 7/06 | (2006.01) |
| F16H 57/04 | (2010.01) |
| B23Q 11/12 | (2006.01) |
| F02C 7/14 | (2006.01) |
| F01D 25/18 | (2006.01) |
| F02C 7/36 | (2006.01) |
| F02C 1/00 | (2006.01) |
| F02C 6/00 | (2006.01) |

(52) U.S. Cl.
CPC . F02C 7/14 (2013.01); F01D 25/18 (2013.01); F02C 7/36 (2013.01)
USPC .............. 60/204; 60/39.08; 60/772; 60/802; 184/6.12; 184/6.14

(58) Field of Classification Search
USPC ........... 60/39.08, 39.162, 204, 268, 772, 792, 60/802, 226.1; 184/6.12, 6.14, 26, 27.2, 184/29; 475/159, 331; 384/473–475; 137/118.01, 119.01; 415/110–113
See application file for complete search history.

(56) References Cited

U.S. PATENT DOCUMENTS

| 2,984,975 | A | 5/1961 | Rodgers et al. |
| 4,153,141 | A | 5/1979 | Methlie |
| 4,782,658 | A | 11/1988 | Perry |
| 5,433,674 | A | 7/1995 | Sheridan et al. |
| 5,472,383 | A | 12/1995 | McKibbin |
| 5,587,068 | A | 12/1996 | Aho, Jr. et al. |
| 6,033,450 | A | 3/2000 | Krul et al. |
| 6,223,616 | B1 | 5/2001 | Sheridan |
| 6,398,833 | B1 | 6/2002 | Santerre et al. |
| 7,326,142 | B2 | 2/2008 | Asahi et al. |
| 7,377,098 | B2 | 5/2008 | Walker et al. |
| 8,230,974 | B2 * | 7/2012 | Parnin .......................... 184/6.11 |
| 2008/0116009 | A1 | 5/2008 | Sheridan et al. |
| 2008/0116010 | A1 | 5/2008 | Portlock et al. |
| 2008/0245614 | A1 | 10/2008 | Matucheski |

* cited by examiner

*Primary Examiner* — Phutthiwat Wongwian
*Assistant Examiner* — Arun Goyal
(74) *Attorney, Agent, or Firm* — Kinney & Lange, P.A.

(57) ABSTRACT

An assembly includes a gas turbine engine, a compartment wall, and a gutter system. The gas turbine engine has a spool connected to a fan shaft via a gear system. The compartment wall is positioned radially outward from the gear system. The gutter system is positioned radially outward from the gear system for capturing lubricating liquid slung from the gear system and positioned radially inward of the compartment wall. The gutter system includes a gutter and a flow passage fluidically connected to the gutter. The flow passage has a plurality of holes that allow the lubricating liquid to pass through the flow passage into a space between the flow passage and the compartment wall.

17 Claims, 5 Drawing Sheets

OIL BYPASS CHANNEL DEAERATOR FOR A GEARED TURBOFAN ENGINE

CROSS-REFERENCE TO RELATED APPLICATION(S)

Reference is made to application Ser. No. 12/470,903, now U.S. Pat. No. 8,051,869, entitled "GRAVITY OPERATED VALVE", filed on May 22, 2009; application Ser. No. 12/470,823, now U.S. Pat. No. 8,230,974, entitled "WINDMILL AND ZERO GRAVITY LUBRICATION SYSTEM", filed on May 22, 2009; application Ser. No. 12/393,743, now U.S. Pat. No. 8,307,626, entitled "AUXILIARY PUMP SYSTEM FOR FAN DRIVE GEAR SYSTEM", filed on Feb. 26, 2009; and application Ser. No. 12/617,001, now U.S. Pat. No. 8,381,878, entitled "OIL CAPTURE AND BYPASS SYSTEM", filed on Nov. 12, 2009, all of which are assigned to the same assignee as this application, the disclosures of which are incorporated by reference in their entirety.

BACKGROUND

The present invention relates to a lubrication system, and more particularly, to a lubrication system for a fan drive gear system in gas turbine engines.

In many gas turbine engines, a low pressure spool includes a low pressure turbine connected to and driving a low pressure compressor, and a high pressure spool includes a high pressure turbine connected to and driving a high pressure compressor. In some gas turbine engines, a fan at the front of the engine is connected to the low pressure spool through a fan drive gear system. One or more supply pumps supply lubricating liquid to the fan drive gear system and one or more scavenge pumps typically scavenge the lubricating liquid from the fan drive gear system. If the scavenged lubricating liquid is highly aerated, a small scavenge pump may not be suitable to scavenge the lubricating liquid from the fan drive gear system, thus causing flow to back up and potentially lead to oil leakage, excess heat generation, and low oil quantity alarms. If a larger scavenge pump is used, that can add weight and take additional space, which is undesirable in systems where weight and space are a premium.

SUMMARY

According to the present invention, an assembly includes a gas turbine engine, a compartment wall, and a gutter system. The gas turbine engine has a spool connected to a fan shaft via a gear system. The compartment wall is positioned radially outward from the gear system. The gutter system is positioned radially outward from the gear system for capturing lubricating liquid slung from the gear system and positioned radially inward of the compartment wall. The gutter system includes a gutter and a flow passage fluidically connected to the gutter. The flow passage has a plurality of holes that allow the lubricating liquid to pass through the flow passage into a space between the flow passage and the compartment wall.

Another embodiment includes a method for collecting lubricating liquid from a fan drive gear system of a gas turbine engine. The method includes catching lubricating liquid slung from the fan drive gear system with a gutter spaced circumferentially around the fan drive gear system, delivering the lubricating liquid from the gutter to a passage, and passing the lubricating liquid through a plurality of holes in the passage to deaerate the lubricating liquid.

DETAILED DESCRIPTION

Figure 1:
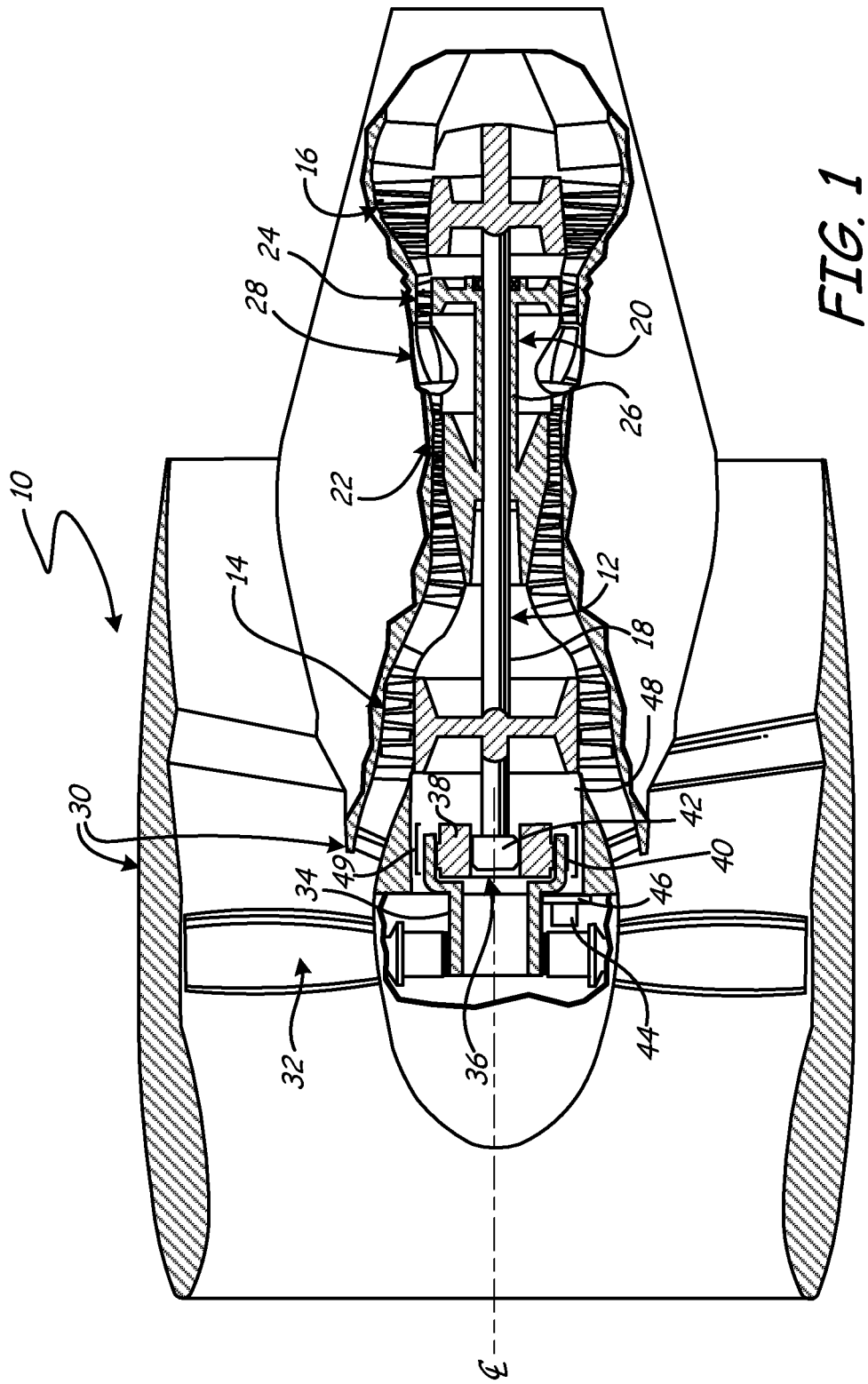
FIG. 1 is a schematic cross-sectional side view of a gas turbine engine with a fan drive gear system.

FIG. 1 is a schematic cross-sectional side view of gas turbine engine 10. Gas turbine engine 10 includes low pressure spool 12 (which includes low pressure compressor 14 and low pressure turbine 16 connected by low pressure shaft 18), high pressure spool 20 (which includes high pressure compressor 22 and high pressure turbine 24 connected by high pressure shaft 26), combustor 28, nacelle 30, fan 32, fan shaft 34, and fan drive gear system 36 (which includes star gear 38, ring gear 40, and sun gear 42). Low pressure spool 12, high pressure spool 20, fan shaft 34, and fan drive gear system 36 all rotate substantially around centerline axis $C_L$.

The general construction and operation of gas turbine engines is well-known in the art, and therefore detailed discussion here is unnecessary. However, a more detailed understanding of fan drive gear system 36 can be helpful. As shown in FIG. 1, low pressure spool 12 is coupled to fan shaft 34 via fan drive gear system 36. In the illustrated embodiment, fan drive gear system 36 is a "star gear system". Sun gear 42 is attached to and rotates with low pressure shaft 18. Ring gear 40 is rigidly connected to fan shaft 34 which turns at the same speed as fan 32. Star gear 38 is coupled between sun gear 42 and ring gear 40 such that star gear 38 revolves about its axis, when sun gear 42 rotates. When low pressure spool 12 rotates, fan drive gear system 36 causes fan shaft 34 to rotate at a slower rotational velocity than that of low pressure spool 12. This allows fan 32 and low pressure spool 12 to rotate at different speeds for improved operation of both fan 32 and low pressure spool 12. In an alternative embodiment, fan drive gear system 36 can be a "planetary gear system". In a planetary gear system, ring gear 40 is fixed and fan shaft 34 is attached to a carrier (not shown) that carries star gear 38 (also called a planet gear). Star gear 38 orbits about sun gear 42 as it spins between sun gear 42 and ring gear 40.

Pump 44 is coupled to and is driven by fan shaft 34 via pump gear 46 such that pump 44 can operate whenever fan shaft 34 is rotating. Pump 44 supplies a lubricating liquid, such as oil, to lubricate components such as gears and bearings of fan drive gear system 36. Fan drive gear system 36 benefits from a relatively continuous supply of lubricating liquid whenever fan shaft 34 is rotating. In an alternative embodiment, pump 44 can be an electrically driven oil pump. At least some of the lubricating liquid supplied to fan drive gear system 36 drains to sump 48 and is eventually pumped back through pump 44. Gutter system 49 is positioned circumferentially around fan drive gear system 36 to catch and collect a portion of the lubricating liquid that drips or is slung off fan drive gear system 36, as further explained below.

Figure 2:
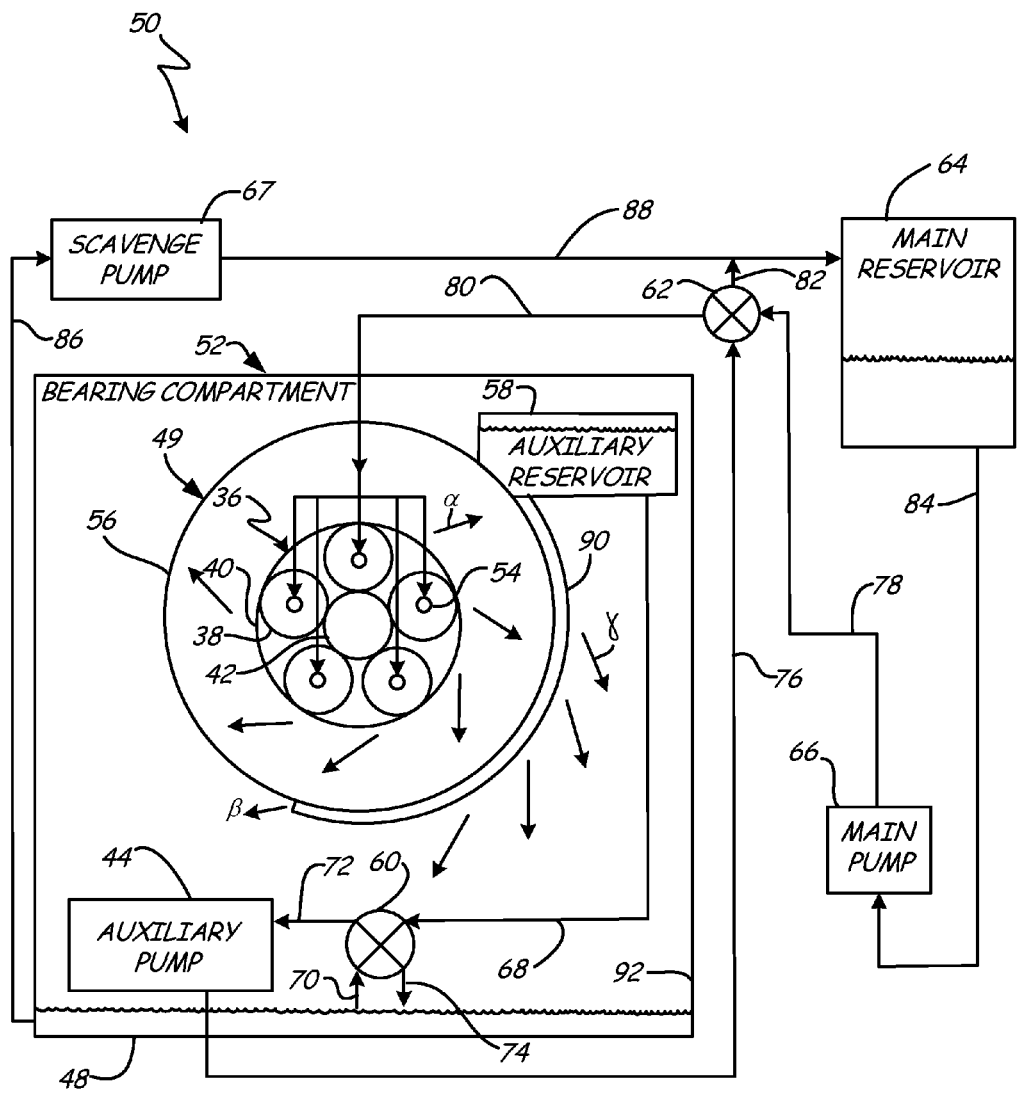
FIG. 2 is a schematic view of a pump system for use in the gas turbine engine of FIG. 1.

FIG. 2 is a schematic view of pump system 50. Pump system 50 includes bearing compartment 52 having a compartment cavity that contains fan drive gear system 36 (including bearings 54), auxiliary pump 44, gutter system 49 (including gutter 56 and passage 90), auxiliary reservoir 58, and first shuttle valve 60. Pump system 50 also includes second shuttle valve 62, main reservoir 64, main pump 66, and scavenge pump 67 positioned outside of bearing compartment 52. Passages 68, 70, 72, 74, 76, 78, 80, 82, 84, 86, 88, and 90 connect the various components as illustrated and as further described, below.

As fan drive gear system 36 spins, lubricating liquid drips or is slung off fan drive gear system 36 into bearing compartment 52 in different directions, illustrated by arrows α. A portion of that liquid is caught and collected by gutter 56 and funneled to auxiliary reservoir 58. During normal operating conditions, auxiliary reservoir 58 is kept substantially full of liquid for later use. In one embodiment, auxiliary reservoir 58 contains enough liquid to provide adequate lubrication for fan drive gear system 36 for a specified amount of time. Liquid in excess of that required by auxiliary reservoir 58 is delivered to bypass passage 90 and ultimately to main scavenge passage 86. Gutter system 49 has a series of holes (illustrated in FIG. 5) that allows lubricating liquid to pass in directions illustrated by arrows γ and β toward wall 92 of bearing compartment 52.

Gutter 56 does not collect all liquid leaving fan drive gear system 36. The remaining liquid that is not collected by gutter 56 falls to sump 48, which is an open-top reservoir at a bottom of bearing compartment 52. Bearing compartment 52 can be sealed to reduce liquid flow out of bearing compartment 52, except through designated passages as herein described.

Second shuttle valve 62 is fluidically connected to auxiliary pump 44 via passage 76, to main pump 66 via passage 78, to bearings 54 via passage 80, and to main reservoir 64 via passages 82 and 88. Second shuttle valve 62 selectively directs fluid flow from auxiliary pump 44 or main pump 66 to bearings 54. Main reservoir 64 is further connected to main pump 66 through passage 84. Scavenge pump 67 is connected to sump 48 via main scavenge passage 86 and to main reservoir 64 via passage 88. Scavenge pump 67 pumps a portion of the liquid in sump 48 to main reservoir 64 for use by main pump 66. (See application Ser. No. 12/470,823 entitled "WINDMILL AND ZERO GRAVITY LUBRICATION SYSTEM" filed on May 22, 2009 and assigned to the same assignee as this application for a more detailed description of the function of second shuttle valve 62).

First shuttle valve 60 is fluidically connected to auxiliary reservoir 58 via passage 68, to sump 48 via passage 70, to auxiliary pump 44 via passage 72, and again to sump 48 via passage 74. As part of pump system 50, first shuttle valve 60 and second shuttle valve 62 work together as a valve system. This valve system directs lubricating liquid to bearings 54 from one of sump 48, auxiliary reservoir 58, or main reservoir 64. When engine operating conditions prevent main pump 66 from supplying adequate liquid, second shuttle valve 62 switches from main pump 66 to auxiliary pump 44. Switching to auxiliary pump 44 can be beneficial if it has an adequate supply of liquid from first shuttle valve 60 during all gravity conditions. (See application Ser. No. 12/470,903 entitled "GRAVITY OPERATED VALVE" filed on May 22, 2009 and assigned to the same assignee as this application for a more detailed description of the function of first shuttle valve 60).

Figure 3:
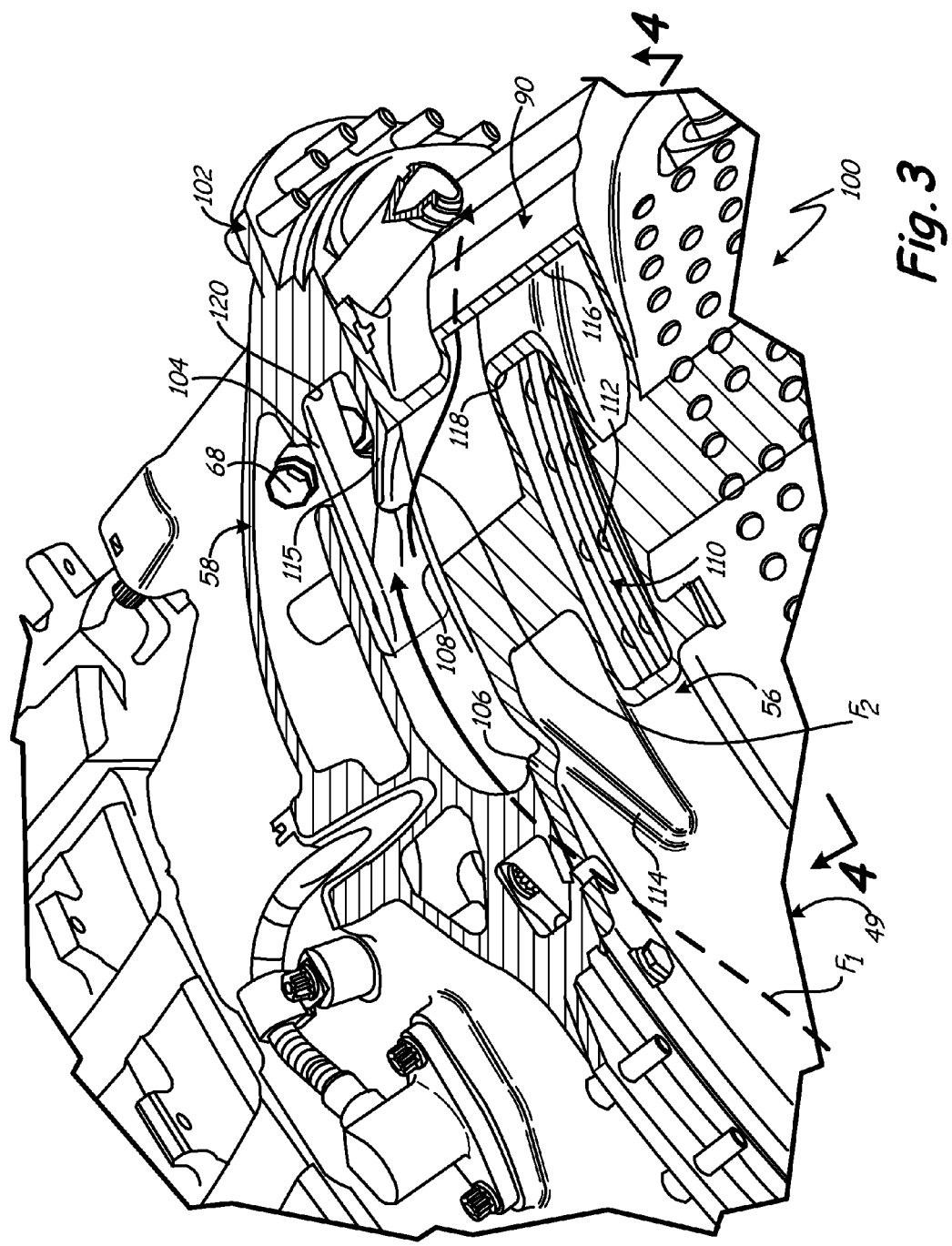
FIG. 3 is a partial perspective view of an oil capture and bypass system with a portion cut away.

FIG. 3 is a partial perspective view of oil capture and bypass system 100. In order to show greater detail in FIG. 3, a portion of oil capture and bypass system 100 has been cut away and removed. Oil capture and bypass system 100 includes gutter 56, auxiliary reservoir 58, and bypass passage 90. In the illustrated embodiment, auxiliary reservoir 58 is integrally formed with, and exists completely inside, bearing support 102. Bearing support 102 supports No. 1 and No. 1.5 bearings (not shown) of fan shaft 34 (shown in FIG. 1). Bearing support 102 includes sub-supports 104 that are positioned inside auxiliary reservoir 58, without substantially restricting flow within auxiliary reservoir 58. Auxiliary reservoir 58 has reservoir inlet 106 positioned relatively near reservoir outlet 108.

Gutter 56 is positioned radially outward from centerline axis $C_L$ (shown in FIG. 1) and extends circumferentially around fan drive gear system 36 (shown in FIGS. 1 and 2) for capturing lubricating liquid slung from fan drive gear system 36. A portion of gutter 56 is cut away to show flange 110. Flange 110 is connected to ring gear 40 (shown in FIGS. 1 and 2). The lubricating liquid from fan drive gear system 36 is slung through holes 112 in flange 110 into gutter 56. The lubricating liquid then slides around gutter 56 until it gets to gutter exit channel 114.

When auxiliary reservoir 58 is substantially empty, lubricating liquid from gutter 56 fills auxiliary reservoir 58. When auxiliary reservoir 58 is substantially full, excess lubricating liquid hits a "wall" of liquid and is then forced through reservoir outlet 108 into bypass passage 90 with the aid of diverter 115 which acts as a scoop to capture the excess liquid. Flow arrow $F_1$ generally illustrates the direction of flow through reservoir inlet 106. Flow arrow $F_2$ generally illustrates the direction of flow through reservoir outlet 108.

In the illustrated embodiment, gutter 56 and bypass passage 90 are integrally formed as gutter system 49 and can be cast as a single piece. Exterior wall 118 of gutter 56 is essentially a shared wall between gutter 56 and bypass passage 90. Because gutter system 49 abut directly to auxiliary reservoir 58, the connections can be made without a separate intervening connector pipe and without the losses in flow energy associated therewith. This configuration allows gutter 56 and auxiliary reservoir 58 to be substantially side-by-side.

Figure 4:
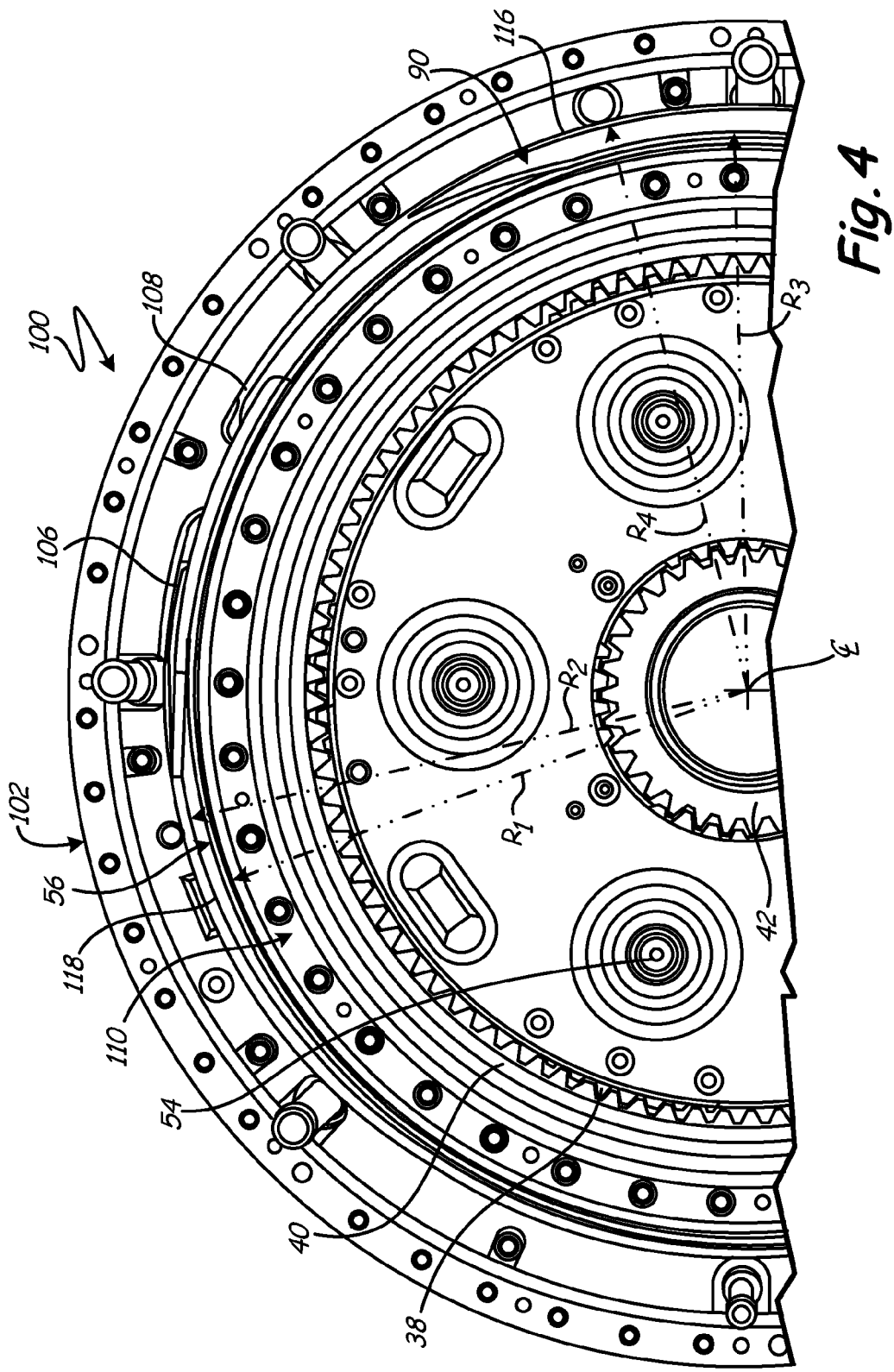
FIG. 4 is a partial sectional elevation view of an upper portion of the oil capture and bypass system taken along line 4-4 in FIG. 3.

FIG. 4 is a partial sectional elevation view of a portion of oil capture and bypass system 100 taken along line 4-4 in FIG. 3. The view of FIG. 4 is from the aft of gas turbine engine 10 (shown in FIG. 1) looking forward along centerline axis $C_L$. Gutter inner radius $R_1$ extends from centerline axis $C_L$ to an inner diameter of gutter 56. Gutter outer radius $R_2$ extends from centerline axis $C_L$ to exterior wall 118 at an outer diameter of gutter 56. Bypass passage inner radius $R_3$ extends from centerline axis $C_L$ to an inner diameter of bypass passage 90. Bypass passage outer radius $R_4$ extends from centerline axis $C_L$ to exterior wall 116 at an outer diameter of bypass passage 90. In the illustrated embodiment, gutter inner radius $R_1$ is about 10.1 inches (25.654 centimeters). Gutter outer radius $R_2$ is about 10.5 inches (26.67 centimeters). Bypass passage inner radius $R_3$ is about the same as gutter inner radius $R_1$. Bypass passage outer radius $R_4$ is about 11 inches (27.84 centimeters). This allows about a 0.5 inch (1.27 centimeter) gap between exterior wall 116 and exterior wall 118 such that a portion of bypass passage 90 is radially outward from gutter 56 but other portions of bypass passage 90 are on both sides of gutter 56, having the same radial distance from centerline axis $C_L$ as a portion of gutter 56. Auxiliary reservoir 58 (shown in FIG. 3) is obscured in FIG. 4; however, the radius from centerline axis $C_L$ to exterior wall 120 (shown in FIG. 3) of auxiliary reservoir 58 is about the same as $R_2$. This configuration allows oil capture and bypass system 100 to have a relatively small maximum radius. The respective radii of the various elements need not, however, be precisely as illustrated.

Figure 5:
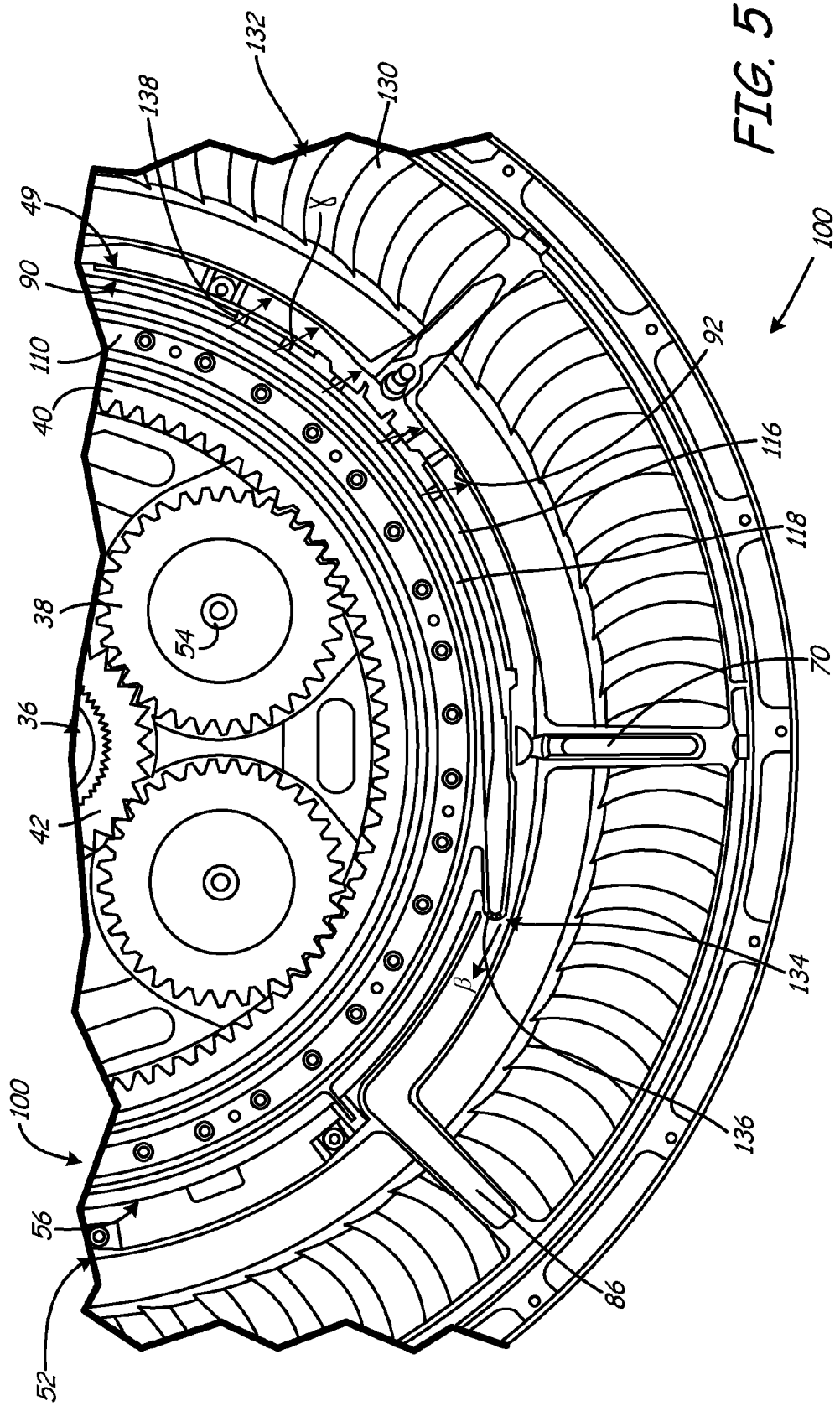
FIG. 5 is a partial sectional elevation view of a lower portion of the oil capture and bypass system.

FIG. 5 is a partial sectional elevation view of a lower portion of oil capture and bypass system 100. FIG. 5 shows fan drive gear system 36, which is surrounded by gutter system 49 of oil capture and bypass system 100, which is surrounded by wall 92 of bearing compartment 52, which is surrounded by a plurality of inlet guide vane blades 130 of inlet guide vane system 132.

Bypass passage 90 is bounded by wall 116 and wall 118 and terminates at metered restriction end 134. Aerated lubricating liquid flows through bypass passage 90 in a clockwise direction toward metered restriction end 134. Metered restriction end 134 has hole 136 to drain lubricating liquid after engine shut down in a direction illustrated by arrow β. Wall 116 also includes a plurality of holes 138. Holes 138 allow aerated lubricating liquid to pass through in directions illustrated by arrows γ and contact wall 92 of bearing compartment 52. The action of being squirted from holes 138 against wall 92 causes aerated lubricating liquid to substantially deaerate. Deaerated lubricating liquid from holes 138 continue to flow in a clockwise direction through a space between gutter system 49 and wall 92 to main scavenge passage 86 to be scavenged by scavenge pump 67 (shown in FIG. 2). Scavenge pump 67 creates a suction to pull lubricating liquid through main scavenge passage 86 and return it to main reservoir 64 (shown in FIG. 2). By removing air from the lubricating liquid, scavenge pump 67 can pump the lubricating liquid more efficiently.

In one embodiment, holes 138 can be about 0.125 inches (3.175 millimeters) in diameter. In alternative embodiments, holes 138 can have a diameter of between about 0.125 inches (3.175 millimeters) and about 0.180 inches (4.572 millimeters). In still further alternative embodiments, holes 138 can be sized with a diameter suitable for squirting aerated lubricating liquid against wall 92 so as to cause the aerated lubricating liquid to deaerate.

In the illustrated embodiment, each of holes 138 extend through wall 116 of bypass passage 90 at locations vertically higher than the lowest position of wall 116. Wall 116 of bypass passage 90 curves circumferentially with respect to centerline axis $C_L$ (shown in FIGS. 1 and 4). This curvature forces aerated lubricating liquid traveling clockwise through bypass passage 90 to curve. This orientation also forces a substantial amount of lubricating liquid to pass through holes 138 and be deaerated upon impact with wall 92. Because the lubricating liquid has a relatively high velocity when it strikes wall 92, the amount of air in the aerated lubricating liquid is decreased.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, pump system 50 can include more or fewer pumps, valves, reservoirs, and passages than illustrated and described above. Moreover, oil capture and bypass system 100 need not be constructed precisely as illustrated, so long as gutter system 49 includes holes suitable for deaeration as claimed below.

The invention claimed is:

1. An assembly comprising:
   a gas turbine engine having a spool connected to a fan shaft via a gear system;
   a compartment wall positioned radially outward from the gear system and enclosing the gear system; and
   a gutter system positioned radially outward from the gear system for capturing lubricating liquid slung from the gear system and positioned radially inward of the compartment wall, wherein the gutter system includes:
   a gutter comprising a gutter wall positioned radially outward from the gear system, wherein the gutter wall extends circumferentially around the gear system; and
   an exterior wall disposed radially outward from the gutter wall, wherein the exterior wall and the gutter wall bound and define a flow passage fluidically connected to the gutter, wherein the exterior wall has a plurality of holes configured to allow the lubricating liquid to exit the flow passage into a space between the exterior wall and the compartment wall.

2. The assembly of claim 1, wherein the flow passage curves circumferentially with respect to a centerline axis of the gas turbine engine.

3. The assembly of claim 1, wherein one or more of the plurality of holes pass through a metered restriction at an end of the flow passage.

4. The assembly of claim 1, wherein the plurality of holes pass through the exterior wall of the flow passage such that lubricating liquid passing through the plurality of holes contacts a surface of the compartment wall.

5. The assembly of claim 4, wherein the plurality of holes extend through the exterior wall of the flow passage at locations vertically higher than a lowest vertical position of the exterior wall.

6. The assembly of claim 4, wherein the plurality of holes extend through the exterior wall where the exterior wall curves circumferentially with respect to a centerline axis of the gas turbine engine.

7. The assembly of claim 4, wherein the plurality of holes have a diameter of about 0.125 inches (3.175 millimeters).

8. The assembly of claim 4, wherein the plurality of holes have a diameter of between about 0.125 inches (3.175 millimeters) and about 0.180 inches (4.572 millimeters).

9. The assembly of claim 1, and further comprising:
   a reservoir fluidically connected between the gutter and the flow passage, wherein the flow passage is a bypass passage to allow flow from the gutter to bypass the reservoir when the reservoir is substantially full.

10. The assembly of claim 1, and further comprising:
    a scavenge pump; and
    a main scavenge passage fluidically connecting the scavenge pump to the space between the gutter system and the compartment wall.

11. An assembly for collecting lubricating liquid from a fan drive gear system of a gas turbine engine, the assembly comprising:
    a gutter positioned radially outward from the fan drive gear system, wherein the gutter comprises a gutter wall extending circumferentially around the fan drive gear system;
    a reservoir fluidically connected to the gutter; and
    a bypass passage extending from the reservoir, wherein the bypass passage is disposed between and bound by the gutter wall and an exterior wall disposed radially outward from the gutter wall, wherein the exterior wall comprises a plurality of holes configured to allow lubricating liquid to pass therethrough.

12. The assembly of claim 11, wherein the gutter and the bypass passage are integrally formed.

13. A method for collecting lubricating liquid from a fan drive gear system of a gas turbine engine, the method comprising:
    catching lubricating liquid slung from a fan drive gear system with a gutter spaced circumferentially around the fan drive gear system, wherein the gutter comprises a gutter wall;

delivering the lubricating liquid from the gutter to a passage, wherein the passage is disposed between and bound by the gutter wall and an exterior wall disposed radially outward from the gutter wall; and passing the lubricating liquid through a plurality of holes in the exterior wall of the passage to deaerate the lubricating liquid.

14. The method of claim 13, wherein the plurality of holes extend through a wall of the passage and wherein the lubricating liquid is squirted through the plurality of holes against a wall of a bearing compartment so as to deaerate the lubricating liquid.

15. The method of claim 13, and further comprising:

collecting the lubricating liquid passed through the plurality of holes in a space inside a wall of a bearing compartment; and scavenging the lubricating liquid from the space inside the wall of the bearing compartment via a scavenge passage connected to a scavenge pump.

16. The method of claim 13, and further comprising:

delivering the lubricating liquid from the gutter to an auxiliary reservoir when the auxiliary reservoir is not substantially full, wherein the lubricating liquid is delivered from the gutter to the passage, substantially bypassing the auxiliary reservoir, when the reservoir is substantially full.

17. The assembly of claim 13, wherein one or more of the plurality of holes pass through a metered restriction at an end of the flow passage.

* * * * *